(12) United States Patent
Haun et al.

(10) Patent No.: US 6,377,427 B1
(45) Date of Patent: Apr. 23, 2002

(54) ARC FAULT PROTECTED ELECTRICAL RECEPTACLE

(75) Inventors: Andy A. Haun, Cedar Rapids; Robert F. Dvorak, Mt. Vernon; Brett E. Larson, Cedar Rapids; Brian Grattan, Cedar Rapids; Kon B Wong, Cedar Rapids, all of IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/466,424

(22) Filed: Dec. 17, 1999

Related U.S. Application Data

(63) Continuation-in-part of application No. 09/129,685, filed on Aug. 5, 1998, now Pat. No. 6,259,996, which is a continuation-in-part of application No. 09/026,193, filed on Feb. 19, 1998, now Pat. No. 6,246,556, which is a continuation-in-part of application No. 08/814,754, filed on Mar. 7, 1997, now Pat. No. 6,195,241, which is a division of application No. 08/600,512, filed on Feb. 13, 1996, now Pat. No. 5,682,101, which is a continuation-in-part of application No. 08/402,678, filed on Mar. 13, 1995, now abandoned, and a continuation-in-part of application No. 08/402,600, filed on Mar. 13, 1995, now abandoned, and a continuation-in-part of application No. 08/402,575, filed on Mar. 13, 1995, now abandoned, and a continuation-in-part of application No. 08/403,084, filed on Mar. 13, 1995, now abandoned, and a continuation-in-part of application No. 08/403,033, filed on Mar. 13, 1995, now abandoned.

(51) Int. Cl.⁷ .................................................. H02H 3/00
(52) U.S. Cl. .......................................... 361/42; 702/58
(58) Field of Search ...................... 361/42–50; 324/520, 324/522, 536, 613; 702/58, 64, 66, 69

(56) References Cited

U.S. PATENT DOCUMENTS

| | | | |
|---|---|---|---|
| 2,808,566 A | 10/1957 | Douma | 324/127 |
| 2,832,642 A | 4/1958 | Lennox | 299/132 |
| 2,898,420 A | 8/1959 | Kuze | 200/87 |
| 2,971,130 A | 2/1961 | Diebold | 317/16 |
| 3,471,784 A | 10/1969 | Arndt et al. | 324/126 |
| 3,538,241 A | 11/1970 | Rein | 174/143 |
| 3,588,611 A | 6/1971 | Lambden et al. | 317/31 |
| 3,600,502 A | 8/1971 | Wagenaar et al. | 174/143 |
| 3,622,872 A | 11/1971 | Boaz et al. | 324/52 |
| 3,660,721 A | 5/1972 | Baird | 317/16 |
| 3,684,955 A | 8/1972 | Adams | 324/72 |
| 3,716,757 A | 2/1973 | Rodriguez | 317/40 R |
| 3,746,930 A | 7/1973 | Van Best et al. | 317/31 |
| 3,775,675 A | 11/1973 | Freeze et al. | 324/51 |

(List continued on next page.)

FOREIGN PATENT DOCUMENTS

| | | | |
|---|---|---|---|
| CA | 2267490 | 3/1999 | H02H/3/00 |
| CA | 2256208 | 6/1999 | H01H/9/50 |
| CA | 2256243 | 6/1999 | H02H/3/16 |

(List continued on next page.)

OTHER PUBLICATIONS

Paolantonio, Antonio N., P.E., Directional Couplers, R.F. Design, pp. 40–49 (Sep./Oct. 1979).

(List continued on next page.)

*Primary Examiner*—Ronald W. Leja
(74) *Attorney, Agent, or Firm*—Kareem M. Irfan; Larry I. Golden

(57) ABSTRACT

An arcing fault protection assembly in an electrical outlet, and a corresponding method determine whether arcing is present in circuits connected to the outlet. The assembly comprises a sensor, a broadband noise circuit, and a controller. The sensor detects a current and develops a corresponding sensor signal. The broadband noise circuit determines the presence of broadband noise in the sensor signal and produces a corresponding output signal. The controller processes the sensor signal and the output signal in a predetermined fashion to determine whether an arcing fault is present. The sensor, broadband noise circuit, and controller are mounted to the outlet receptacle or to an outlet box which houses the receptacle.

30 Claims, 10 Drawing Sheets

U.S. PATENT DOCUMENTS

| | | | |
|---|---|---|---|
| 3,812,337 A | 5/1974 | Crosley | 235/153 AC |
| 3,858,130 A | 12/1974 | Misencik | 335/18 |
| 3,868,549 A | 2/1975 | Schaefer et al. | 317/11 E |
| 3,869,665 A | 3/1975 | Kenmochi et al. | 324/72 |
| 3,878,460 A | 4/1975 | Nimmersjo | 324/52 |
| 3,911,323 A | 10/1975 | Wilson et al. | 317/18 |
| 3,914,667 A | 10/1975 | Waldron | 317/36 |
| 3,932,790 A | 1/1976 | Muchnick | 317/18 D |
| 3,939,410 A | 2/1976 | Bitsch et al. | 324/72 |
| 4,052,751 A | 10/1977 | Shepard | 361/50 |
| 4,074,193 A | 2/1978 | Kohler | 324/126 |
| 4,081,852 A | 3/1978 | Coley et al. | 361/45 |
| 4,087,744 A | 5/1978 | Olsen | 324/51 |
| 4,130,850 A | 12/1978 | Cronin et al. | 361/54 |
| 4,156,846 A | 5/1979 | Harrold et al. | 324/158 |
| 4,169,260 A | 9/1979 | Bayer | 340/562 |
| 4,214,210 A | 7/1980 | O'Shea | 455/282 |
| 4,233,640 A | 11/1980 | Klein et al. | 361/44 |
| 4,245,187 A | 1/1981 | Wagner et al. | 324/54 |
| 4,251,846 A | 2/1981 | Pearson et al. | 361/30 |
| 4,264,856 A | 4/1981 | Frierdich et al. | 322/25 |
| RE30,678 E | 7/1981 | Van Zeeland et al. | 361/44 |
| 4,316,187 A | 2/1982 | Spencer | 340/664 |
| 4,344,958 A | 8/1982 | Broersma, Jr. et al. | 424/273 R |
| 4,354,154 A | 10/1982 | Olsen | 324/51 |
| 4,356,443 A | 10/1982 | Emery | 324/51 |
| 4,378,525 A | 3/1983 | Burdick | 324/127 |
| 4,387,336 A | 6/1983 | Joy et al. | 324/51 |
| 4,459,576 A | 7/1984 | Fox et al. | 336/84 |
| 4,466,071 A | 8/1984 | Russell, Jr. | 364/492 |
| 4,477,855 A | 10/1984 | Nakayama et al. | 361/54 |
| 4,587,588 A | 5/1986 | Goldstein | 361/54 |
| 4,616,200 A | 10/1986 | Fixemer et al. | 335/35 |
| 4,639,817 A | 1/1987 | Cooper et al. | 361/62 |
| 4,642,733 A | 2/1987 | Schacht | 361/42 |
| 4,644,439 A | 2/1987 | Taarning | 361/87 |
| 4,652,867 A | 3/1987 | Masot | 340/638 |
| 4,658,322 A | 4/1987 | Rivera | 361/37 |
| 4,697,218 A | 9/1987 | Nicolas | 633/882 |
| 4,702,002 A | 10/1987 | Morris et al. | 29/837 |
| 4,707,759 A | 11/1987 | Bodkin | 831/642 |
| 4,723,187 A | 2/1988 | Howell | 361/13 |
| 4,771,355 A | 9/1988 | Emery et al. | 361/33 |
| H536 H | 10/1988 | Strickland et al. | 324/456 |
| H538 H | 11/1988 | Betzold | 89/134 |
| 4,810,954 A | 3/1989 | Fam | 324/142 |
| 4,816,958 A | 3/1989 | Belbel et al. | 361/93 |
| 4,833,564 A | 5/1989 | Pardue et al. | 361/93 |
| 4,835,648 A | 5/1989 | Yamauchi | 361/14 |
| 4,839,600 A | 6/1989 | Kuurstra | 324/127 |
| 4,845,580 A | 7/1989 | Kitchens | 361/91 |
| 4,847,719 A | 7/1989 | Cook et al. | 361/13 |
| 4,853,818 A | 8/1989 | Emery et al. | 361/33 |
| 4,858,054 A | 8/1989 | Franklin | 361/57 |
| 4,866,560 A | 9/1989 | Allina | 361/104 |
| 4,878,144 A | 10/1989 | Nebon | 361/96 |
| 4,882,682 A | 11/1989 | Takasuka et al. | 364/507 |
| 4,893,102 A | 1/1990 | Bauer | 335/132 |
| 4,901,183 A | 2/1990 | Lee | 361/56 |
| 4,922,368 A | 5/1990 | Johns | 361/62 |
| 4,931,894 A | 6/1990 | Legatti | 361/45 |
| 4,939,495 A | 7/1990 | Peterson et al. | 337/79 |
| 4,949,214 A | 8/1990 | Spencer | 361/95 |
| 4,969,063 A | 11/1990 | Scott et al. | 361/93 |
| 5,010,438 A | 4/1991 | Brady | 361/56 |
| 5,047,724 A | 9/1991 | Boksiner et al. | 324/520 |
| 5,051,731 A | 9/1991 | Guim et al. | 340/638 |
| 5,121,282 A | 6/1992 | White | 361/42 |
| 5,166,861 A | 11/1992 | Krom | 361/379 |
| 5,168,261 A | 12/1992 | Weeks | 340/515 |
| 5,179,491 A | 1/1993 | Runyan | 361/45 |
| 5,185,684 A | 2/1993 | Beihoff et al. | 361/45 |
| 5,185,685 A | 2/1993 | Tennies et al. | 361/45 |
| 5,185,686 A | 2/1993 | Hansen et al. | 361/45 |
| 5,185,687 A | 2/1993 | Beihoff et al. | 361/45 |
| 5,206,596 A | 4/1993 | Beihoff et al. | 324/536 |
| 5,208,542 A | 5/1993 | Tennies et al. | 324/544 |
| 5,223,795 A * | 6/1993 | Blades | 361/113 |
| 5,224,006 A | 6/1993 | MacKenzie et al. | 361/45 |
| 5,257,157 A | 10/1993 | Epstein | 361/111 |
| 5,280,404 A | 1/1994 | Ragsdale | 361/113 |
| 5,286,933 A | 2/1994 | Pham | 200/144 B |
| 5,307,230 A | 4/1994 | MacKenzie | 361/96 |
| 5,321,574 A | 6/1994 | Patrick et al. | 361/99 |
| 5,334,939 A | 8/1994 | Yarbrough | 324/424 |
| 5,353,014 A | 10/1994 | Carroll et al. | 340/638 |
| 5,359,293 A | 10/1994 | Boksiner et al. | 324/544 |
| 5,363,269 A | 11/1994 | McDonald | 361/45 |
| 5,373,241 A | 12/1994 | Ham, Jr. et al. | 324/536 |
| 5,383,084 A | 1/1995 | Gershen et al. | 361/113 |
| 5,388,021 A | 2/1995 | Stahl | 361/56 |
| 5,396,179 A | 3/1995 | Domenichini et al. | 324/546 |
| 5,412,526 A | 5/1995 | Kapp et al. | 361/56 |
| 5,414,590 A | 5/1995 | Tajali | 361/669 |
| 5,420,740 A | 5/1995 | MacKenzie et al. | 361/45 |
| 5,424,894 A | 6/1995 | Briscall et al. | 361/45 |
| 5,434,509 A | 7/1995 | Blades | 324/536 |
| 5,444,424 A | 8/1995 | Wong et al. | 335/172 |
| 5,446,431 A | 8/1995 | Leach et al. | 335/18 |
| 5,448,443 A | 9/1995 | Muelleman | 361/111 |
| 5,452,222 A | 9/1995 | Gray et al. | 364/481 |
| 5,452,223 A | 9/1995 | Zuercher et al. | 364/483 |
| 5,459,630 A | 10/1995 | MacKenzie et al. | 361/45 |
| 5,473,494 A | 12/1995 | Kurosawa et al. | 361/3 |
| 5,477,150 A | 12/1995 | Ham, Jr. et al. | 324/536 |
| 5,481,235 A | 1/1996 | Heise et al. | 335/18 |
| 5,483,211 A | 1/1996 | Carrodus et al. | 335/18 |
| 5,485,093 A | 1/1996 | Russell et al. | 324/522 |
| 5,493,278 A | 2/1996 | MacKenzie et al. | 340/638 |
| 5,499,189 A | 3/1996 | Seitz | 364/480 |
| 5,506,789 A | 4/1996 | Russell et al. | 364/492 |
| 5,510,946 A | 4/1996 | Franklin | 361/56 |
| 5,512,832 A | 4/1996 | Russell et al. | 324/522 |
| 5,519,561 A | 5/1996 | Mrenna et al. | 361/105 |
| 5,531,617 A | 7/1996 | Marks | 439/723 |
| 5,537,327 A | 7/1996 | Snow et al. | 364/483 |
| 5,544,003 A | 8/1996 | Vaughan | 361/625 |
| 5,546,266 A | 8/1996 | Mackenzie et al. | 361/93 |
| 5,561,605 A | 10/1996 | Zuercher et al. | 364/483 |
| 5,568,371 A | 10/1996 | Pitel et al. | 363/39 |
| 5,578,931 A | 11/1996 | Russell et al. | 324/536 |
| 5,590,010 A | 12/1996 | Ceola et al. | 361/93 |
| 5,590,012 A | 12/1996 | Dollar | 361/113 |
| 5,602,709 A | 2/1997 | Al-Dabbagh | 361/85 |
| 5,608,328 A | 3/1997 | Sanderson | 324/529 |
| 5,617,019 A | 4/1997 | Etter | 324/117 R |
| 5,638,244 A | 6/1997 | Mekanik et al. | 361/62 |
| 5,646,502 A | 7/1997 | Johnson | 320/5 |
| 5,657,244 A | 8/1997 | Seitz | 364/492 |
| 5,659,453 A | 8/1997 | Russell et al. | 361/93 |
| 5,661,645 A | 8/1997 | Hochstein | 363/89 |
| 5,682,101 A | 10/1997 | Brooks et al. | 324/536 |
| 5,691,869 A | 11/1997 | Engel et al. | 361/42 |
| 5,701,110 A | 12/1997 | Scheel et al. | 335/132 |
| 5,706,154 A | 1/1998 | Seymour | 361/42 |
| 5,726,577 A | 3/1998 | Engel et al. | 324/536 |
| 5,729,145 A | 3/1998 | Blades | 324/536 |
| 5,764,125 A | 6/1998 | May | 336/92 |
| 5,805,397 A | 9/1998 | Mackenzie | 361/42 |
| 5,805,398 A | 9/1998 | Rae | 361/42 |
| 5,815,352 A | 9/1998 | Mackenzie | 361/42 |

| | | | |
|---|---|---|---|
| 5,818,237 A | 10/1998 | Zuercher et al. | 324/536 |
| 5,818,671 A | 10/1998 | Seymour et al. | 361/42 |
| 5,825,598 A | 10/1998 | Dickens et al. | 361/42 |
| 5,834,940 A | 11/1998 | Brooks et al. | 324/424 |
| 5,835,319 A | 11/1998 | Welles, II et al. | 361/5 |
| 5,835,321 A | 11/1998 | Elms et al. | 361/45 |
| 5,839,092 A | 11/1998 | Erger et al. | 702/58 |
| 5,847,913 A | 12/1998 | Turner et al. | 361/93 |
| 5,875,087 A | 2/1999 | Spencer et al. | 361/87 |
| 5,886,861 A | 3/1999 | Parry | 361/42 |
| 5,889,643 A | 3/1999 | Elms | 361/42 |
| 5,896,262 A | 4/1999 | Rae et al. | 361/94 |
| 5,905,619 A | 5/1999 | Jha | 361/93 |
| 5,933,308 A | 8/1999 | Garzon | 361/62 |
| 5,946,179 A | 8/1999 | Fleege et al. | 361/93 |
| 6,031,699 A | 2/2000 | Dollar, II et al. | 361/142 |
| 6,040,967 A | 3/2000 | DiSalvo | 361/142 |
| 6,052,046 A | 4/2000 | Ennis et al. | 335/202 |
| 6,084,756 A | 7/2000 | Doring et al. | 361/45 |
| 6,191,589 B1 | 2/2001 | Clunn | 324/424 |
| 6,198,611 B1 | 3/2001 | Macbeth | 361/42 |
| 6,215,378 B1 | 4/2001 | Gibson et al. | 335/18 |
| 6,229,679 B1 | 5/2001 | Macbeth | 361/42 |
| 6,229,680 B1 | 5/2001 | Shea | 361/42 |
| 6,232,857 B1 | 5/2001 | Mason, Jr. et al. | 335/18 |

FOREIGN PATENT DOCUMENTS

| | | | |
|---|---|---|---|
| CA | 2277589 | 6/1999 | H02H/3/16 |
| CA | 2265204 | 12/1999 | H01H/83/00 |
| CA | 2305910 | 10/2000 | H01H/71/04 |
| CA | 2307812 | 11/2000 | H01H/83/00 |
| EP | 0094871 A1 | 5/1983 | H02H/1/00 |
| EP | 0615327 A2 | 9/1994 | H02H/1/00 |
| EP | 0649207 A1 | 4/1995 | H02H/3/04 |
| EP | 0748021 A1 | 12/1996 | H02H/1/00 |
| EP | 0762591 A2 | 3/1997 | H02H/3/33 |
| EP | 0802602 A2 | 10/1997 | H02H/1/00 |
| EP | 0813281 A2 | 12/1997 | H02H/1/00 |
| EP | 0974995 A2 | 1/2000 | H01H/71/02 |
| EP | 0981193 A2 | 2/2000 | H01H/1/00 |
| EP | 1005129 | 5/2000 | H02H/1/00 |
| GB | 2177561 A | 6/1985 | H02H/3/00 |
| GB | 2285886 A | 7/1995 | H01H/71/74 |
| JP | 1-158365 | 6/1989 | G01R/15/02 |
| WO | WO92/08143 | 5/1992 | G01R/31/00 |
| WO | WO 97/30501 | 8/1997 | H02H/1/00 |
| WO | WO00/11696 | 3/2000 | H01H/73/00 |
| WO | WO00/36623 | 6/2000 | H01H/83/04 |
| WO | WO00/39771 | 7/2000 | G08B/21/00 |
| WO | WO01/01536 A1 | 1/2001 | H02H/3/00 |

OTHER PUBLICATIONS

Duenas, Alejandro J., Directional Coupler Design Graphs For Parallel Coupled Lines And Interdigitated 3dB Couplers, RF Design, pp. 62–64 (Feb. 1986).

RV4145 Low Power Ground Fault Interrupter, Preliminary Product Specifications Of Integrated Circuits, Raytheon Company Semiconductor Division, pp. 1–8 (no date).

Joubert, Jean–Francois, Feasibility Of Main Service Ground–Fault Protection On The Electrical Service To Dwelling Units, Consultants Electro–Protection Ins., pp. 1–77 (Oct. 26, 1990).

Russell, B.D., Detection Of Arcing Faults On Distribution Feeders, Texas A & M Research Foundation, Final Report, pp. 1–B18 (Dec. 1982).

JP 06308191, dated Apr. 11, 1994, Abstract.

* cited by examiner

ARC FAULT PROTECTED ELECTRICAL RECEPTACLE

CROSS REFERENCE TO RELATED APPLICATIONS

This application is a continuation-in-part of application Ser. No. 09/129,685, filed Aug. 5, 1998, now U.S. Pat. No. 6,259,996, which is a continuation-in-part of application Ser. No. 09/026,193, filed Feb. 19, 1998, now U.S. Pat. No. 6,246,556, which is a continuation-in-part of application Ser. No. 08/814,754, filed Mar. 7, 1997, now U.S. Pat. No. 6,195,241, which is a division of application Ser. No. 08/600,512, filed Feb. 13, 1996, now U.S. Pat. No. 5,682,101, which is a continuation-in-part of application Ser. No. 08/402,678, filed Mar. 13, 1995, now abandoned, and a continuation-in-part of application Ser. No. 08/402,600, filed Mar. 13, 1995, now abandoned, and a continuation-in-part of application Ser. No. 08/402,575, filed Mar. 13, 1995, now abandoned, and a continuation-in-part of application Ser. No. 08/403,084, filed Mar. 13, 1995, now abandoned, and a continuation-in-part of application Ser. No. 08/403,033, filed Mar. 13, 1995, now abandoned.

Each of the above applications has the same assignee as the present application, and is incorporated herein by reference.

FIELD OF THE INVENTION

The present invention relates to the protection of electrical circuits and, more particularly, to the detection of arcing faults in an electrical assembly for mounting in an electrical outlet box or an electrical outlet receptacle.

BACKGROUND OF THE INVENTION

The electrical systems in residential, commercial and industrial applications usually include a panelboard for receiving electrical power from a utility source. The power is then routed through protection devices to designated branch circuits supplying one or more loads. These protection devices are typically circuit interrupters, such as circuit breakers and fuses, which are designed to interrupt the electrical current if the limits of the conductors supplying the loads are surpassed.

Although circuit breakers are a preferred type of circuit interrupter because they protect a number of outlets simultaneously, ground fault detectors in electrical receptacles or outlets have become increasingly popular in areas where a short circuit caused by contact with water is a possibility, e.g., in bathrooms and kitchens.

Typically, ground fault detectors interrupt an electric circuit due to a disconnect or trip condition, such as a current overload or ground fault. The current overload condition results when a current exceeds the continuous rating of the breaker for a time interval determined by the trip current. A ground fault trip condition is created by an imbalance of currents flowing between a line conductor and a neutral conductor which could be caused by a leakage current or an arcing fault to ground.

Arcing faults are commonly defined as current through ionized gas between two ends of a broken conductor or at a faulty contact or connector, between two conductors supplying a load, or between a conductor and ground. Arcing faults may not, however, cause a conventional circuit breaker to trip. Arcing fault current levels may be reduced by branch or load impedance to a level below the trip curve settings of the circuit breaker. In addition, an arcing fault which does not contact a grounded conductor, object or person will not trip a ground fault protector.

There are many conditions that may cause an arcing fault, for example, corroded, worn or aged wiring, connectors, contacts or insulation, loose connections, wiring damaged by nails or staples through the insulation, and electrical stress caused by repeated overloading, lightning strikes, etc. These faults may damage the conductor insulation and cause the conductor to reach an unacceptable temperature.

SUMMARY OF THE INVENTION

It is an object of the present invention to provide an arc fault detection system and method which reliably detects arc fault conditions which may be ignored by conventional circuit interrupters.

Another object of the invention is to provide an arc fault detection system which utilizes highly reliable electronic signal processing components, so as to be relatively simple and yet highly reliable in operation.

Other and further objects and advantages of the invention will be apparent to those skilled in the art from the present specification taken with the accompanying drawings and appended claims.

In accordance with one aspect of the invention, there is provided an arcing fault protection assembly comprising a sensor, a broadband noise circuit, and a controller. The sensor detects a current flowing at an electrical outlet and develops a corresponding sensor signal. The broadband noise circuit determines the presence of broadband noise in the sensor signal and produces a corresponding output signal. The controller processes the sensor signal and the output signal in a predetermined fashion to determine whether an arcing fault is present. The sensor, broadband noise circuit, and controller are mounted to the outlet receptacle itself or to an outlet box in which the receptacle to be protected will be installed.

In accordance with another aspect of the invention, there is provided a method of determining, at an electrical outlet, whether arcing is present. The method comprises the steps of sensing a current at the outlet and developing a corresponding sensor signal, determining the presence of broadband noise in the sensor signal and producing a corresponding output signal, and processing the sensor signal and the output signal in a predetermined fashion to determine whether an arcing fault is present.

The above summary of the present invention is not intended to represent each embodiment or every aspect of the present invention. This is the purpose of the Figures and detailed description which follow.

BRIEF DESCRIPTION OF THE DRAWINGS

Other objects and advantages of the invention will become apparent upon reading the following detailed description and upon reference to the drawings.

Figure 1:
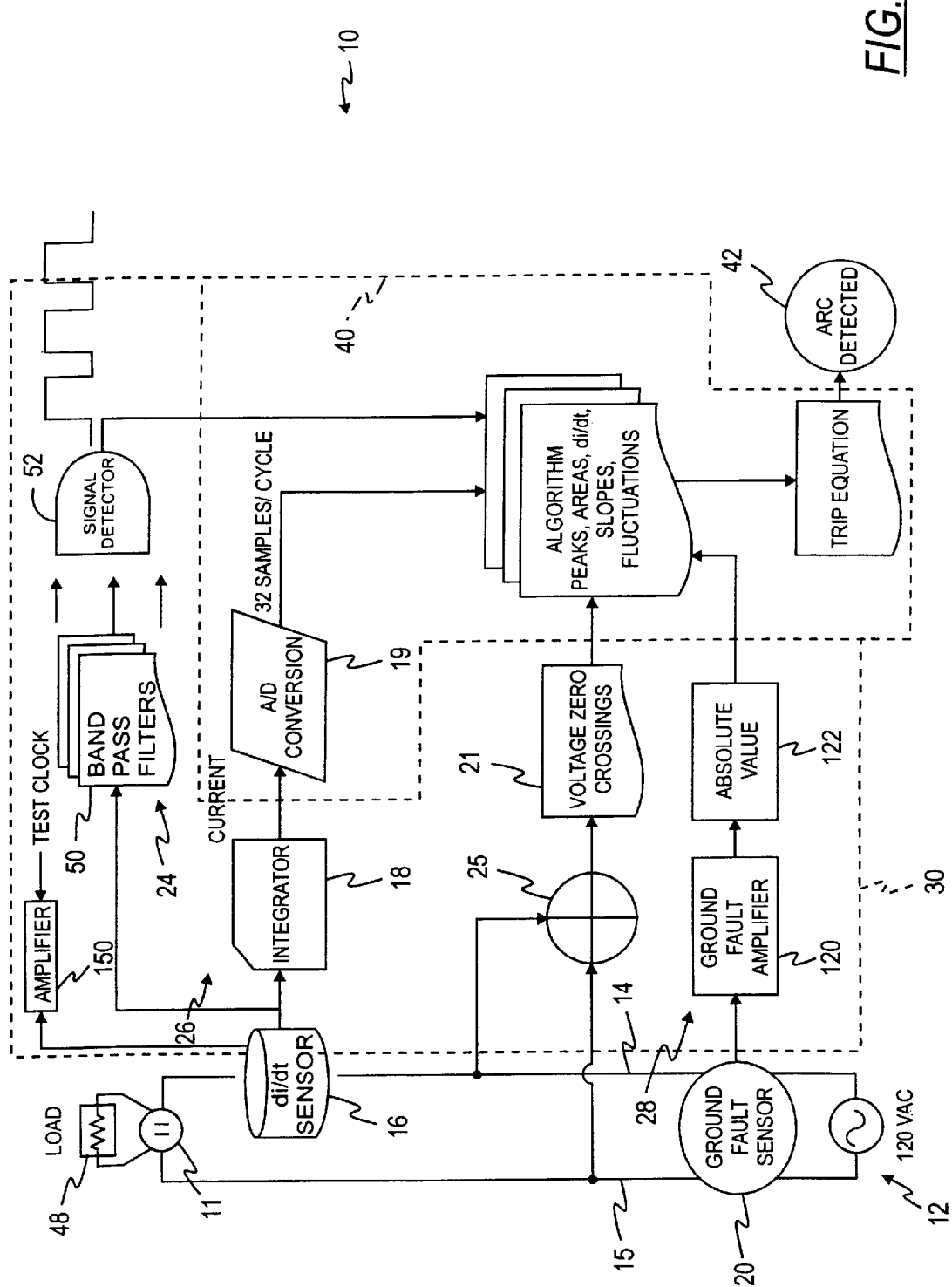
FIG. 1 is a functional block diagram of an arc fault detection system embodying the invention.

While the invention is susceptible to various modifications and alternative forms, a specific embodiment thereof has been shown by way of example in the drawings and will be described in detail. It should be understood, however, that it is not intended to limit the invention to the particular form described but, on the contrary, the intention is to cover all modifications, equivalents and alternatives falling within the spirit and scope of the invention as defined by the appended claims.

DESCRIPTION OF ILLUSTRATIVE EMBODIMENTS

Referring to the drawings and initially to FIG. 1, there is shown in block form a novel arcing fault detector system in accordance with the invention and designated generally by the reference numeral 10. In the illustrative example, the arcing fault detection/protection system 10 is mounted to an electrical outlet 11 which is to be monitored for arcing faults, thus rendering the outlet 11 an arc fault protected outlet or "arcing fault outlet." The arcing fault protection system may include a circuit interruption device, in which case it may be termed an arc fault circuit interrupter (AFCI), and the outlet 11 may be termed an AFCI outlet. The arcing fault detection system 10 detects arcing faults originating at the outlet 11 and downstream from the outlet 11. In particular, an arcing fault originating from a cord, an appliance, or any other item plugged into the outlet 11 will be detected by the arcing fault detection system 10. In addition, the arcing fault detection system 10 detects both series and parallel arcing at the outlet 11. A load 48 connected to the outlet 11 completes an electrical circuit, such as a 120 VAC circuit 12. The present invention, however, is not limited to use with a 120 VAC circuit.

At least one sensor 16 is provided in association with the outlet 11 for producing a signal representative of a signal condition, such as power, voltage or current in the circuit 12. In the illustrated embodiment, this sensor 16 comprises a current rate of change sensor (di/dt). A line conductor 14 of the circuit 12 passes through the rate of change (di/dt) current sensor 16 which produces a signal representative of the rate of change of current flow in the line conductor 14. In the illustrative embodiment, both the line conductor 14 and a neutral conductor 15 of the 120 VAC circuit 12 pass through a ground fault detector or sensor 20 which is responsive to the current flowing through the line 14 and neutral 15 sides of the circuit 12 for producing an output signal at an output 22. If the current flow through the line 14 and neutral 15 conductors is different, this is indicative of a ground fault.

Preferably, the di/dt sensor 16 and the ground fault sensor 20 each comprise a toroidal coil having an annular core which surrounds the relevant conductors, with a toroidal sensing coil wound helically on the core. In the di/dt sensor 16, the core may be made of magnetic material, such as ferrite, iron or molded permeable powder, such that the sensor is capable of responding to rapid changes in flux. An air gap may be cut into the core in certain instances to reduce the permeability, and the core material is such that it does not saturate during the relatively high current produced by some forms of arcing so that arc detection is still possible. The particular requirements for the construction of the toroidal coil and core for the ground fault sensor 20 may differ somewhat for those from the di/dt sensor 16, such ground fault sensors or s transformers being generally known in the art.

During operation, the current in the monitored outlet 11 generates a field which induces a voltage in the di/dt sensor 16. The voltage output of the sensor 16 is primarily proportional to the instantaneous rate of change of current. The calibration of the sensor 16 may be chosen to provide a signal in a range and frequency spectrum in which arcs can be most easily distinguished from loads 48. This range and spectrum may vary with the application.

The di/dt sensor 16 provides an input to an arcing fault detector circuit 24, which may include a broadband noise detector circuit, and to a current measuring circuit 26. In one embodiment, the components of the arcing fault circuit detector 24 and the current measuring circuit 26 are provided on an application specific integrated circuit (ASIC) 30. Suitable output signals from the ASIC 30 are fed to a microcontroller or microprocessor 40 (e.g., PIC 16 C 73 A) which, based on analysis and further processing of the signals provided by the ASIC 30, makes a decision as to whether to send a trip or "are detected" signal 315 to an output 42. This trip signal 315 may be used for activating a trip circuit (not shown) which will, in effect, switch the line side conductor 14 of the 120 VAC circuit 12 to an open circuit condition to remove power from the circuit(s) in which arcing has been detected.

The broadband noise detector 24 comprises one or more band-pass filter circuits 50 which receive the rate of change of current signal from the di/dt sensor 16. The band-passes of these circuits 50 are selected to detect the presence of broadband noise in frequency bands which are representative of a frequency spectrum typical of arcing faults. Each of the band-pass filter circuits 50 feeds a filtered signal, comprising those components of an input signal from the di/dt sensor which fall within their respective band-pass frequency bands, to a signal detector circuit 52.

The output of the sensor 16 may also feed a time-integration or integrator circuit 18. The integrator may be a passive resistor-capacitor circuit followed by an amplified integrator, the output of which is proportional to the AC current. The integrator 18 provides a signal to be sampled by an analog-to-digital A/D converter 19. In one embodiment, the output of the A/D converter 19 is a series of 8 bit (minimum) values representing the current at a rate of 32 samples per half cycle. The A/D converter may be a part of the microprocessor or microcontroller 40. As the frequency drifts from nominal, the time between voltage zero crossings, detected at a zero crossing detection circuit 21, is measured using internal timers and used to vary the sample rate to achieve a constant number of samples per cycle.

The broadband noise circuit 24 determines if there is simultaneously a trigger level signal in two or more frequency bands. In order to do this, a portion of the signal from the di/dt sensor 16 is routed to band-pass filters 50. The minimum number of band-pass filters is two. The frequency bands of the filters are chosen across the spectrum from 10 kHz to 100 kHz. In one example, for a two-band implementation, the center frequencies are 33 kHz and 58 kHz. In this example, the output signals from the band-pass filters 50 are detected (rectified) and filtered with a low pass filter with a corner frequency of 5 kHz. The signal output of each frequency band is routed to a comparator (signal detector) 52, where it is compared with a reference voltage level and, if sufficient, causes an output pulse. The "trigger level" of the signal from each band required to produce an output pulse from the comparator is determined by analyzing the non-arcing load-generated signature of the application. Additional comparators (AND gates) are used to send a pulse whenever multiple filter bands simultaneously receive a triggering signal in their band. The resulting pulses indicating signal acquisition in multiple bands are counted by the microprocessor 40 and used in some arc detection algorithms.

The samples of current are converted into current_peak, current_area, and max(di/dt). These values are stored for each half cycle of voltage.

The use of the terms "band-pass filter," "comparator," "AND gate," and "Integrator" does not limit the invention to hardware equivalents of these devices. Software equivalents of these functions can be implemented, provided the di/dt signal (from sensor 16) is first amplified and converted to digital values.

In the illustrative embodiment, a voltage sensor 25 is implemented as a resistor divider (not shown) which provides an attenuated voltage level compatible with the solid state logic devices. A zero crossing circuit 21 is implemented with a low pass filter (corner frequency 1 kHz) and comparators to provide a digital "1" when the voltage is above zero volts and a digital "0" when the voltage is below zero volts. The microcontroller 40 accepts the logic levels and incorporates timers to determine if the system frequency has increased or decreased from the previous cycle. The A/D sample rate is then adjusted faster or slower to maintain 64±1 samples per cycle.

The ground fault sensor 20 feeds a ground fault amplifier 120 and an absolute value circuit 122 which form the ground fault detector circuit 28. The ground fault amplifier 120 essentially amplifies the low level difference in the current flow between the line 14 and neutral 15 conductors as detected by the ground fault sensor 20. The absolute value circuit 122 turns negative-going signals into positive signals and passes positive-going signals through unchanged.

FIG. 1 illustrates one embodiment of an ASIC 30 for performing the abovedescribed operations. Further details of an ASIC 30 and equivalent circuits which may be utilized may be found in the above-referenced application Ser. No. 09/026,193. Details regarding an algorithm used to analyze the current waveforms and broadband noise to determine whether arcing is present may be found in the above-referenced application Ser. No. 09/129,685.

Figure 2:
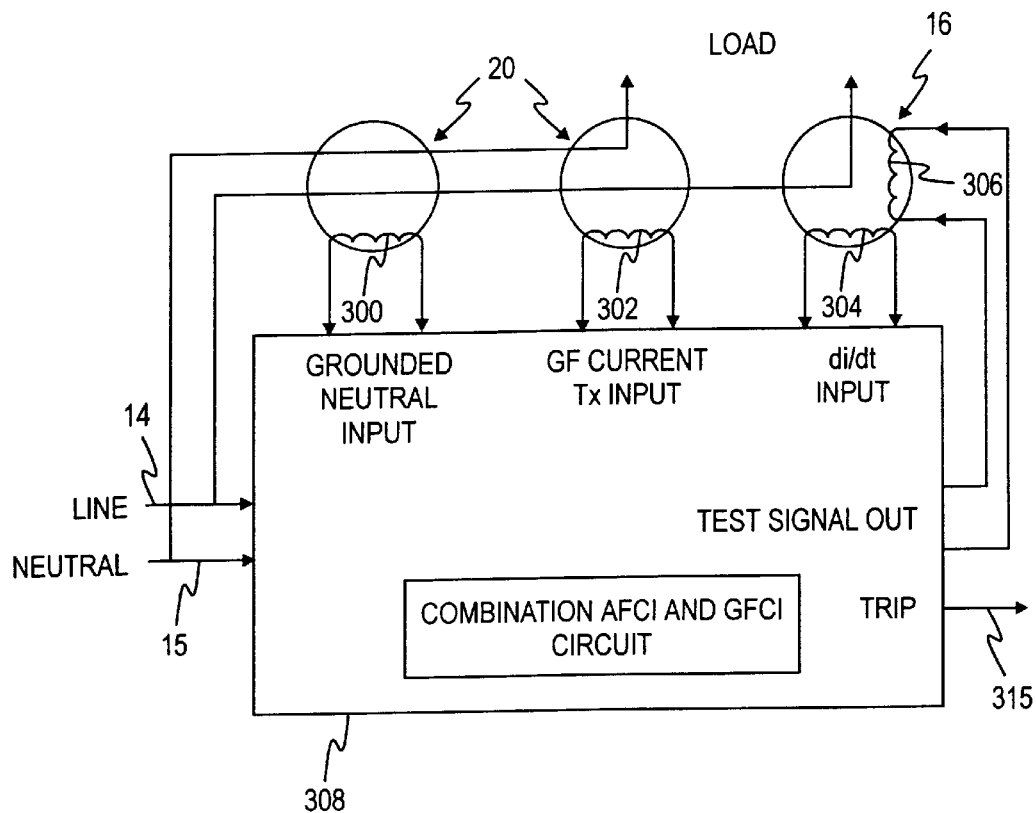
FIGS. 2 and 3 are block diagrams of an arc fault detector system and ground fault sensor in accordance with the present invention.
Figure 3:
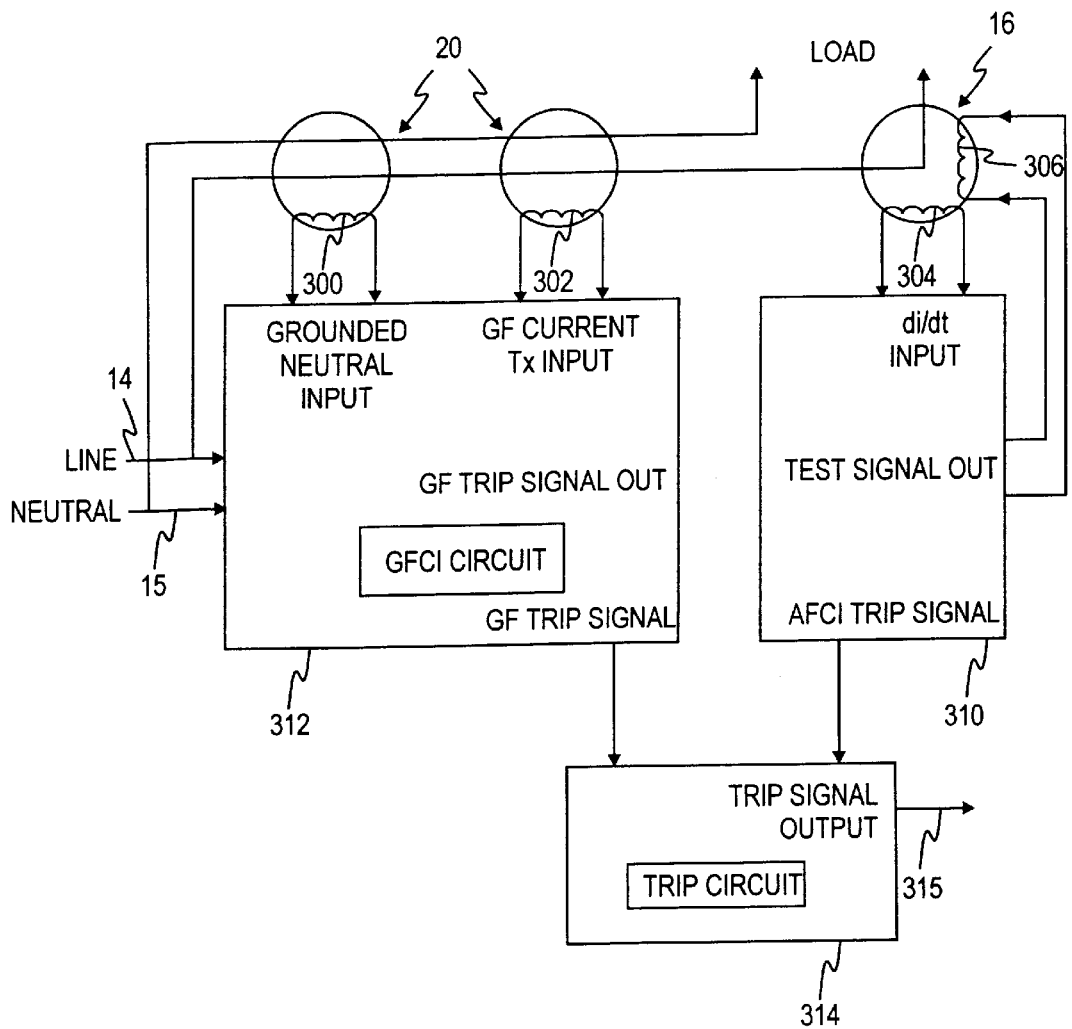

As further illustrated in FIGS. 2 and 3, the ground fault sensor 20 comprises a toroidal coil having a grounded neutral winding 300 and a ground fault current winding 302. The di/dt sensor 16 is a toroidal coil having an annular core surrounding the line conductor 14, and a di/dt winding 304 and a self-test winding 306. The respective windings 300, 302, 304 form like-designated inputs to arcing fault and ground fault circuit 308.

FIG. 2 depicts the arcing fault circuits and ground fault circuits on one integrated circuit 308, while FIG. 3 depicts the arcing fault circuits and self-test circuit on a first integrated circuit 310 with the ground fault circuits on a second integrated circuit 312. Although a trip circuit block 314 in FIG. 3 is separate from the ground fault sensor 20 and arcing fault detector system 10 blocks, it may also be integrated into either block.

In an effort to conserve space, both chip-on-board technology and resistor-on-board technology may be implemented in the arcing fault detector system of the present invention. The chip-on-board technology takes the silicon die of a chip, places it on a circuit board, and covers it with a plastic-like coating. This saves space over the traditional method of using a standard package. A similar idea is to use ball grid array (BGA) packages. These packages save as much space as the chip-on-board technology, but have the advantage of not requiring a clean room. They do, however, require X-ray equipment to inspect the chips. Many manufacturers of silicon chips, including SVI Public Co., Ltd., and Argo Transdata Corp., are now supporting BGA's.

Resistor-on-board technology is a screening process where standard resistors are screened onto a circuit board. Although screened-on resistors are not smaller length-wise or width-wise, they are flat. Therefore, other components can be placed over them. Multek (a DII company) manufactures boards with screened-on resistors.

Figure 4:
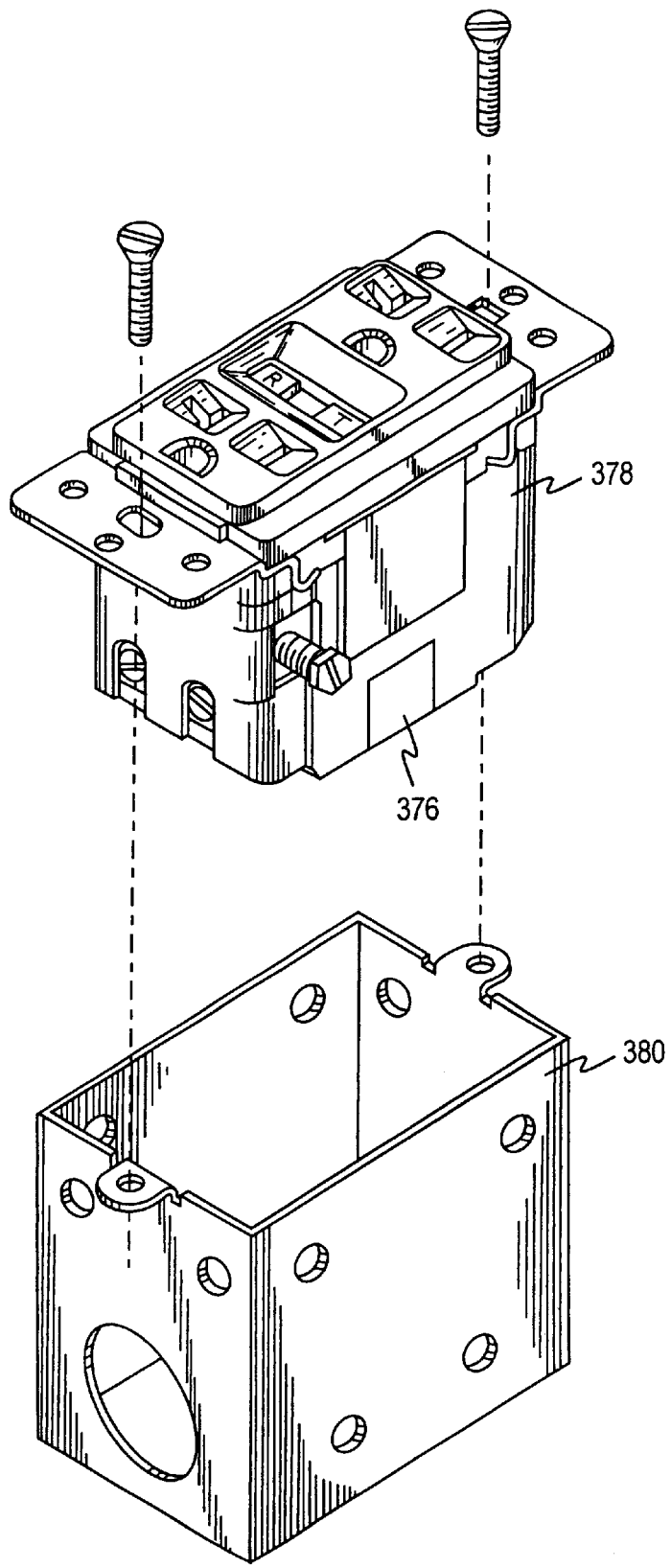
FIG. 4 is an exploded perspective view of an electrical outlet with an arc fault detector system and ground fault sensor mounted to an electrical outlet receptacle in accordance with the present invention.
Figure 5:
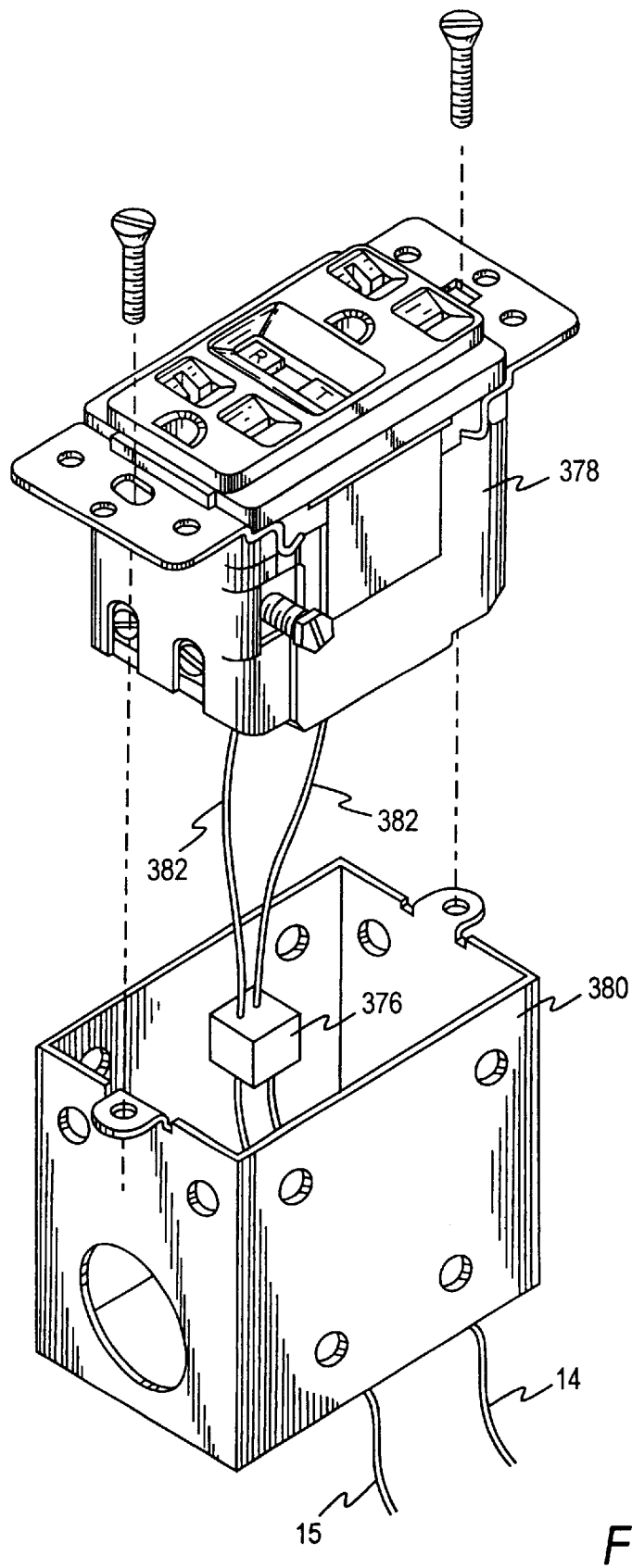
FIG. 5 is an exploded perspective view of an electrical outlet with an arc fault detector system and ground fault sensor mounted to an outlet box in accordance with the present invention.

An arcing fault protection assembly 376 comprising the arcing fault detector system 10, which may also include the ground fault detector circuit 28 and/or the trip circuit block 314, is mounted to an electrical outlet receptacle 378 as shown in FIG. 4. In an alternative embodiment, shown in FIG. 5, the assembly 376 is mounted to an electrical outlet box 380. Wiring 382, comprising the line 14 and neutral 15 conductors, connects the assembly 376 to an electrical outlet receptacle 378 in the alternative embodiment. The assembly 376 may comprise the arcing fault detector system 10, the ground fault detector circuit 28 and the trip circuit block 314 in a standard receptacle. Alternatively, the assembly 376 may comprise the arcing fault detector system 10 in a standard ground fault circuit interrupters (GFCI) receptacle, as shown in FIG. 5.

Figure 6:
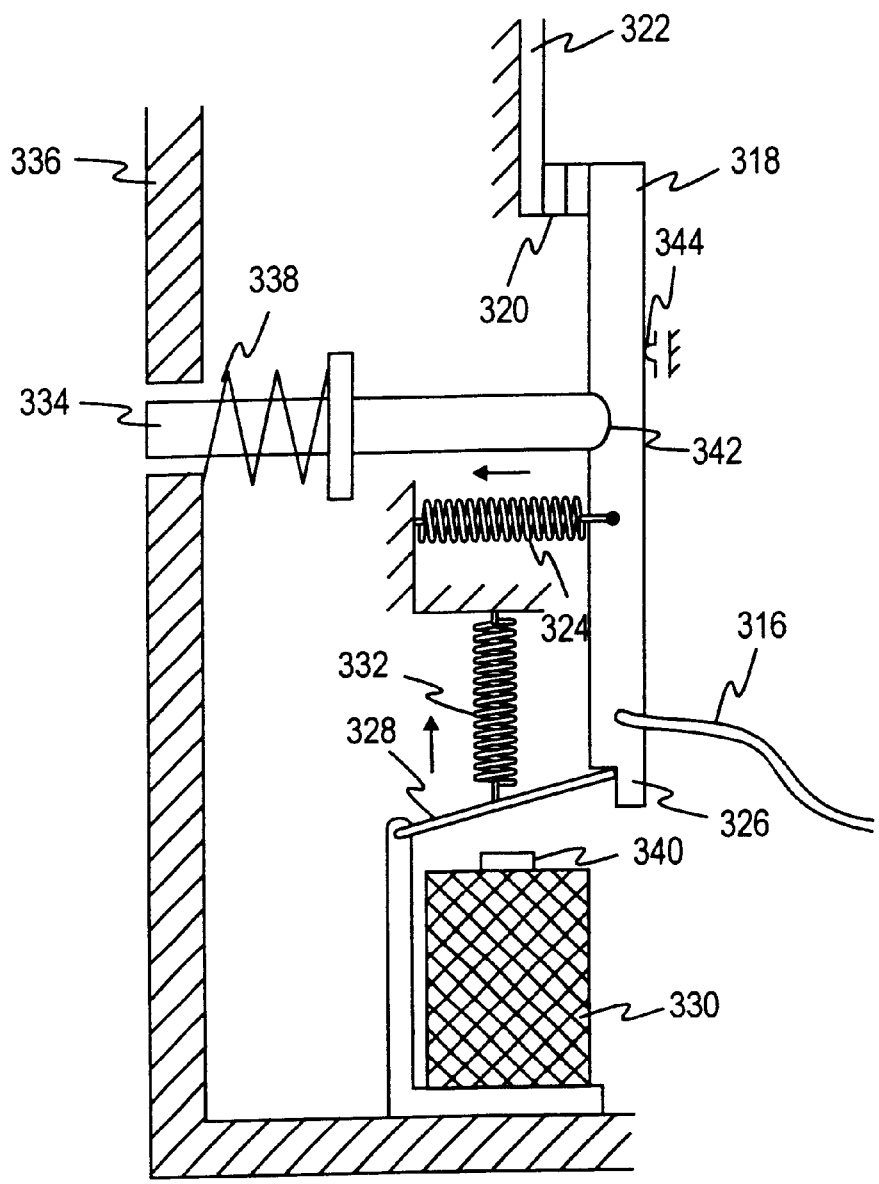
FIG. 6 is a prior art tripping mechanism in the closed position.
Figure 7:
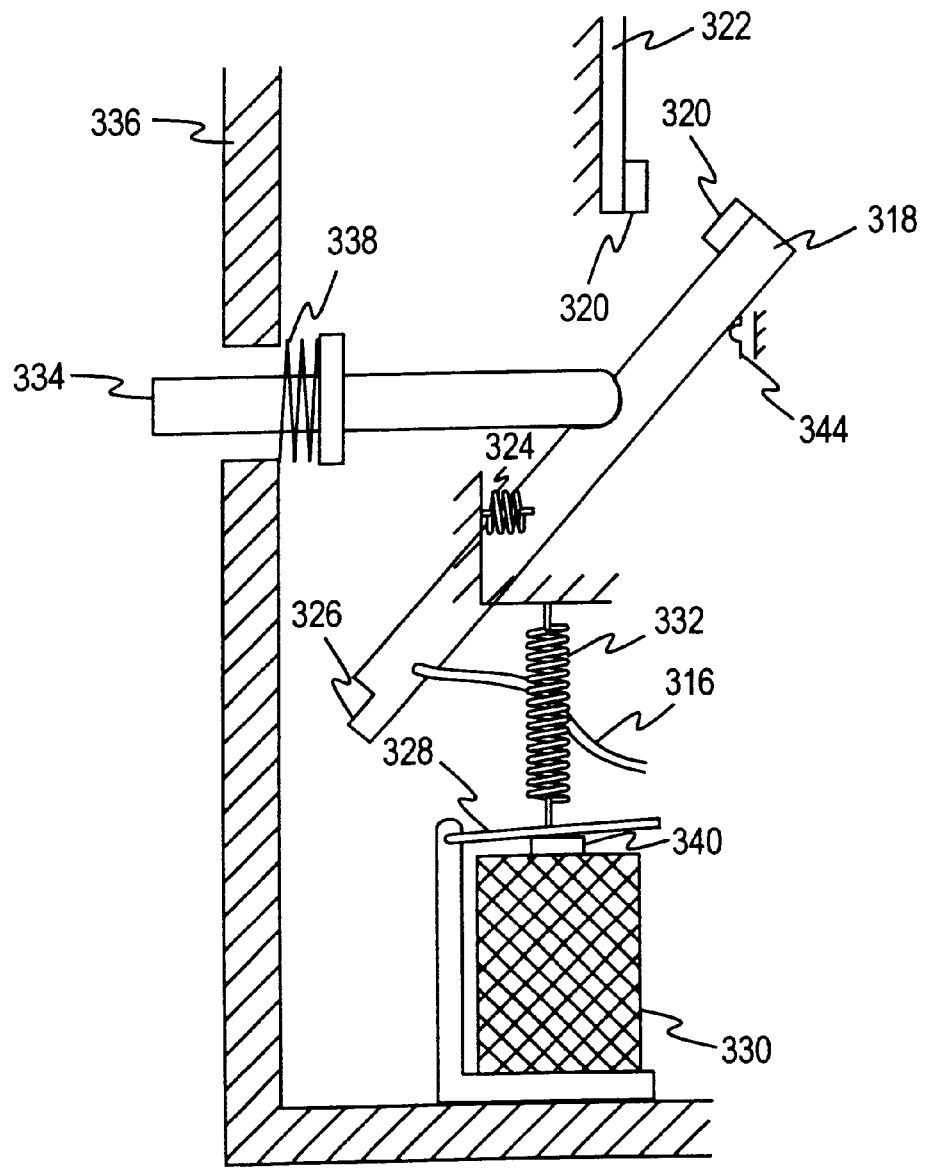
FIG. 7 is a prior art tripping mechanism in the open position.

Conventional tripping mechanisms for GFCI in receptacles may be implemented in conjunction with the arcing fault detector system 10. For example, FIGS. 6 and 7 illustrate a prior art GFCI receptacle tripping mechanism. FIG. 6 illustrates a tripping mechanism for a GFCI and/or AFCI receptacle in the closed position where current can flow though the receptacle to the load 48. The current originates through a pigtail or other flexible conductor 316, through a movable contact arm 318, through mating contacts 320 and to a stationary contact arm 322. The contacts 320 are held closed by a spring 324, while one end of the movable contact arm 318 is supported by and pivoted about a latch 326. A clapper arm 328 is held biased away from a trip coil 330 by a spring 332 with sufficient force to support the movable contact arm 318 in the latched position. A reset and trip indicating button 334 is normally biased into a receptacle housing 336 by a spring 338.

When the trip coil 330 is energized by turning on an SCR or equivalent to short it across the line voltage, the clapper 328 is momentarily pulled to the closed position against a pole piece 340, thereby releasing the latch 326. As seen in FIG. 7, when the clapper 328 closes and removes the support from the latch end of the movable contact arm 318, the arm 318 is free to rotate about the end of the reset button 334 at end 342. The arm 318 then rotates until it contacts stationary surface 344 and opens the contacts 320 to disconnect the receptacle load 48 from the line conductor 14. The trip coil 330, being connected to the load side of the contacts 320, is de-energized when the contacts 320 open.

Although only one set of contacts 320 is shown in FIGS. 6 and 7, a second set of contacts and contact arms are typically provided to open both the line conductor 14 and neutral conductor 15.

In the tripped state, the trip indicator 334 is biased out of the receptacle housing 336, indicating that the device has tripped until the spring 338 is fully compressed. To reset the mechanism to its closed state, the reset button 334 is pushed into the housing 336. This causes the contact arm 318 to pivot about the stationary surface 344, raising the latch end of the contact arm 318 such that spring 332 pulls the clapper 328 back into the latched position. The reset button 334 is then released and the contacts 320 close, while latch 326 once again supports the contact arm 318.

Figure 8:
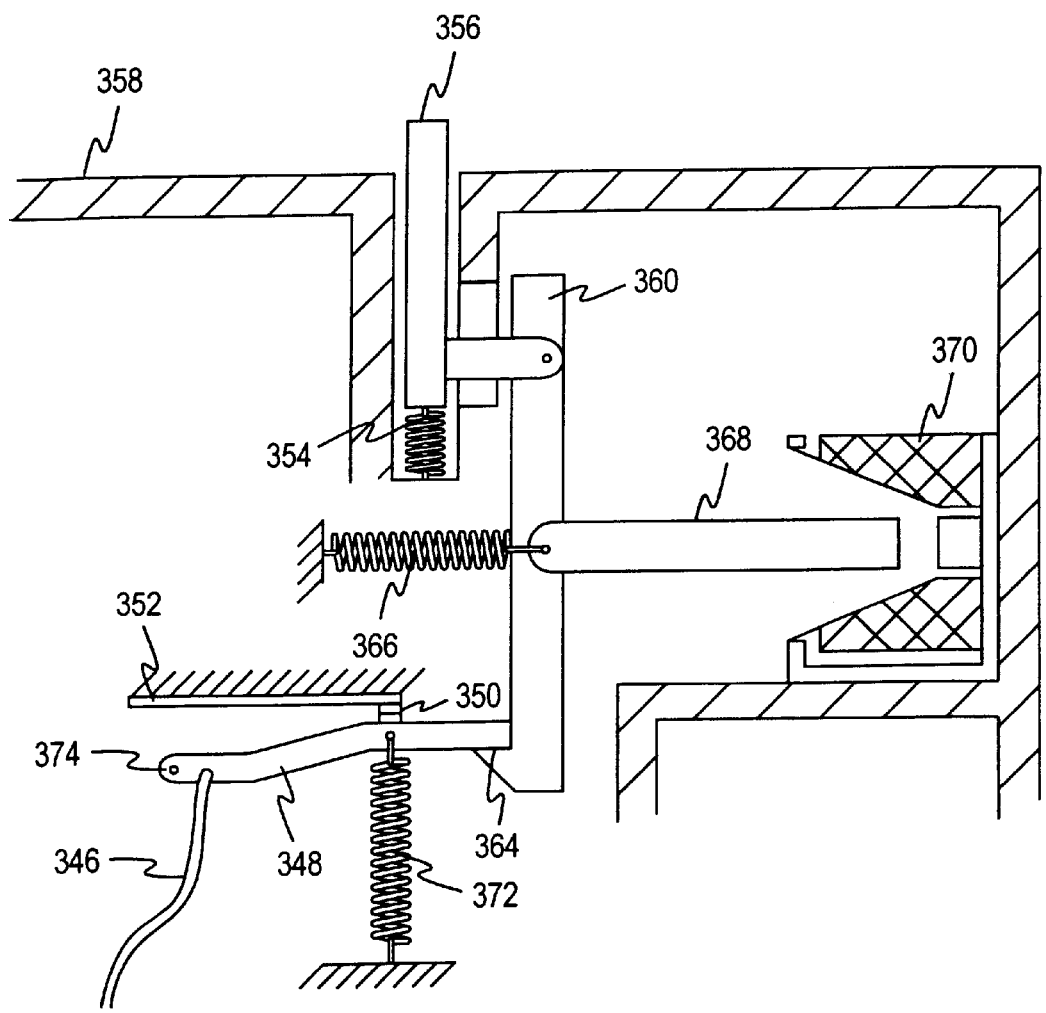
FIG. 8 is a prior art tripping mechanism in the closed position.
Figure 9:
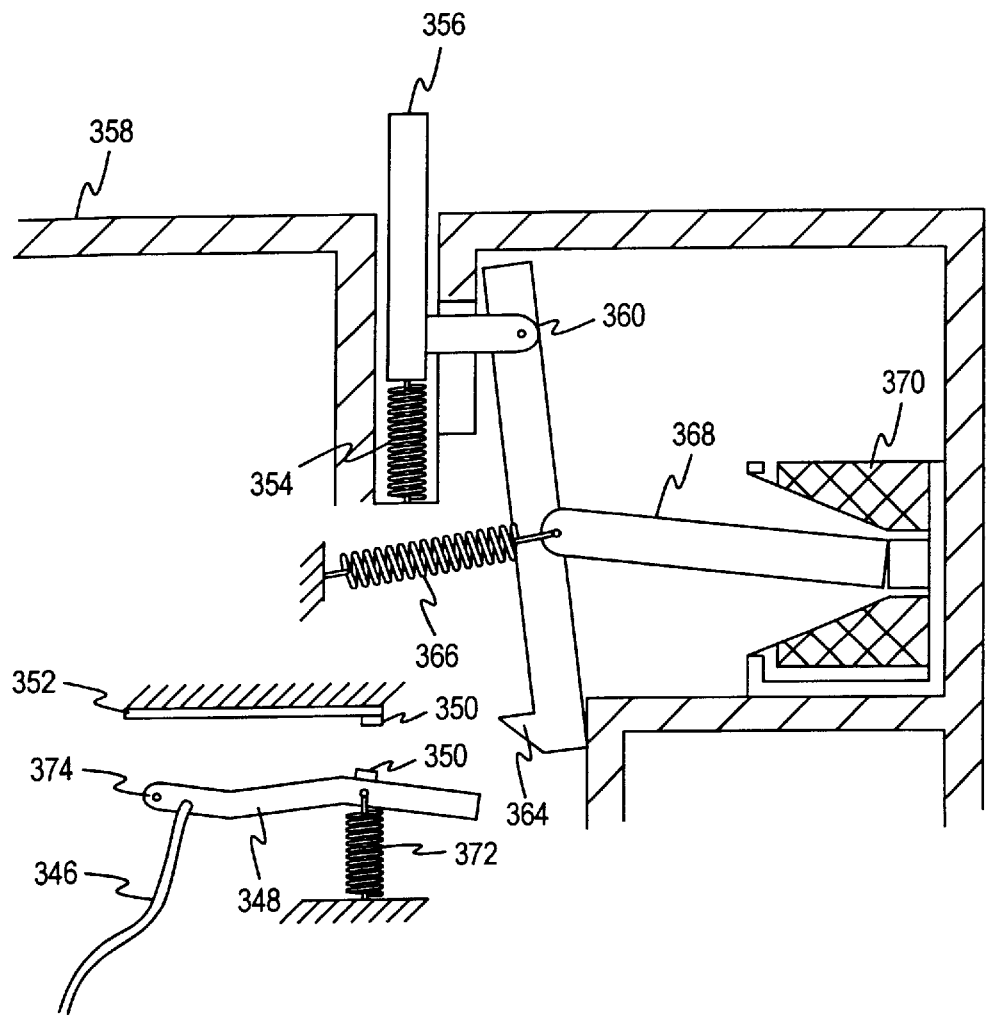
FIG. 9 is a prior art tripping mechanism in the open position.

FIGS. 8 and 9 illustrate an alternate prior art embodiment for a GFCI tripping mechanism. In the closed position, as shown in FIG. 8, when current flows through the receptacle 11 to the load 48, the current path is through a pigtail or other flexible connector 346, through a movable contact arm 348, through mating contacts 350 and to a stationary contact arm 352. A spring 354 forces a trip indicator/reset button 356 in a direction outward from the receptacle housing 358. The trip indicator/reset button 356, in turn, pushes on lever 360 in a direction to force the contacts 350 to close. A notch on the lever 360 forms a latch 364 which mates with the contact arm 348. A plunger bias spring 366 biases the plunger 368 out of a trip coil 370 and holds the lever 360 against the movable contact arm 348 in a latched position. A spring 372 biases the movable contact arm 348 toward the open position; however, latch 364 holds the contacts 350 closed.

When the trip coil 370 is energized by turning on an SCR or equivalent to short the trip coil 370 across the line voltage, the plunger 368 is drawn into the trip coil 370 against the plunger bias spring 366, as shown in FIG. 9, and moves the lever 360 so that the latch 364 is released. With the latch 364 released, the movable contact arm 348 is free to rotate about a pivot 374 under the influence of the spring 372. The contacts 350 are thereby separated, disconnecting the receptacle load 48 from the line. The trip coil 370, being connected to the load side of the contacts 350, is de-energized when the contacts 350 open.

Although only one set of contacts 350 is shown in FIGS. 8 and 9, a second set of contacts and contact arms are typically provided to open both the line conductor 14 and neutral conductor 15.

In the tripped state, as shown in FIG. 9, the trip indicator/reset button 356 extends from the receptacle housing 358, being forced outward by spring 354, to indicate that the device has tripped. To reset the mechanism to its closed state, the trip indicator/reset button 356 is pushed into the housing 358. This causes the lever 360 to move in a direction toward the movable contact arm 348. With the trip coil 370 de-energized, the plunger 368 and lever 360 are biased away from the trip coil 370 by the plunger bias spring 366. As the latch 364 on the end of the lever 360 moves past the latch surface on the movable contact arm 348, the latch 364 is engaged. After the reset button 356 is released, the spring 354 once again forces the contacts 350 together, as described above.

Figure 10:
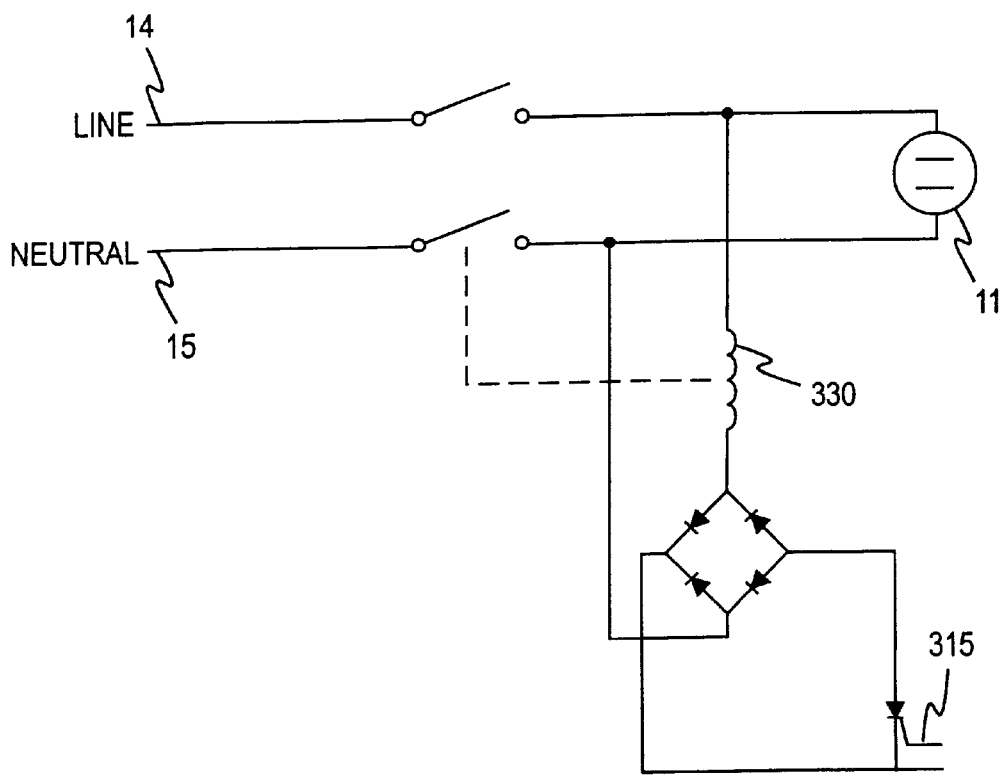
FIG. 10 is a block diagram of the connection of the AFCI and GFCI to a trip coil.

The connection of the AFCI and GFCI trip signals 315 via an SCR 386 to a trip coil 330 and an outlet 11 is depicted in FIG. 10.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An arcing fault protection assembly, comprising:
   a sensor which detects a current flowing at an electrical outlet and develops a corresponding sensor signal;
   a broadband noise circuit which determines the presence of broadband noise in said sensor signal and produces a corresponding output signal; and
   a controller which processes said sensor signal and said output signal in a predetermined fashion to determine whether an arcing fault is present;
   wherein said sensor, said broadband noise circuit, and said controller are mounted to said electrical outlet and;
   wherein the controller includes a plurality of counters and increments said plurality of counters in a predetermined fashion in accordance with said sensor signal and said output signal, and periodically determines whether an arcing fault is present based at least in part on the state of said plurality of counters.

2. The arcing fault protection assembly of claim 1, wherein said controller produces a trip signal in response to a determination that an arcing fault is present.

3. The arcing fault protection assembly of claim 2, frtther comprising:
   a tripping mechanism which stops the current from flowing at the electrical outlet in response to said trip signal.

4. The arcing fault protection assembly of claim 2, further comprising a ground fault sensor which detects a difference in current flow between a line conductor and a neutral conductor of the outlet to determine whether a ground fault is present.

5. The arcing fault protection assembly of claim 4, wherein said controller also produces said trip signal in response to a determination that a ground fault is present.

6. The arcing fault protection assembly of claim 1, further comprising a voltage zero crossing detector coupled with said outlet and said controller, wherein said controller also processes voltage zero crossing information to determine whether an arcing fault is present.

7. The arcing fault protection assembly of claim 1, further comprising a ground fault sensor which detects a difference in current flow between a line conductor and a neutral conductor of the outlet to determine whether a ground fault is present.

8. The arcing fault protection assembly of claim 7, wherein said controller produces a trip signal in response to a determination that a ground fault is present.

9. The arcing fault protection assembly of claim 8, further comprising:
   a tripping mechanism which stops the current from flowing at the electrical outlet in response to said trip signal.

10. The arcing fault protection assembly of claim 1, wherein said broadband noise circuit is integrated into an application specific integrated circuit.

11. The arcing fault protection assembly of claim 1, wherein said arcing fault protection assembly uses chip-on-board technology.

12. The arcing fault protection assembly of claim 1, wherein said arcing fault protection assembly uses resistor-on-board technology.

13. The arcing fault protection assembly of claim 1, wherein said outlet comprises an electrical receptacle and an outlet box.

14. The arcing fault protection assembly of claim 13, wherein said sensor, said broadband noise circuit, and said controller are mounted to said electrical receptacle.

15. The arcing fault protection assembly of claim 13, wherein said sensor, said broadband noise circuit, and said controller are mounted to said outlet box.

16. The arcing fault protection assembly of claim 1, wherein said broadband noise circuit and said controller comprise a microcontroller.

17. The arcing fault protection assembly of claim 1, wherein said broadband noise circuit comprises:

a first band-pass filter circuit responsive to said sensor signal which passes a frequency signal comprising signal components of said sensor signal which fall within a first predetermined frequency band;

a second band-pass filter circuit responsive to said sensor signal which passes a frequency signal comprising signal components of said sensor signal which fall within a second predetermined frequency band; and an AND circuit which receives and ANDs the frequency signals from the first and second band-pass filter circuits.

18. The arcing fault protection assembly of claim 1, wherein said sensor comprises a current rate of change sensor.

19. A method of identifying, at an electrical outlet, whether arcing is present, comprising:

sensing a current at said outlet and developing a corresponding sensor signal;

determining the presence of broadband noise in said sensor signal and producing a corresponding output signal; and processing said sensor signal and said output signal in a predetermined fashion to determine whether an arcing fault is present;

wherein said determining and said processing also take place at said electrical outlet and;

incrementing a plurality of counters in a predetermined fashion in accordance with said sensor signal and said output signal, and periodically determining whether an arcing fault is present based at least in part on the state of said plurality of counters.

20. The method of claim 19, further comprising producing a trip signal in response to a determination that an arcing fault is present.

21. The method of claim 20, further comprising stopping the current at said outlet in response to said trip signal.

22. The method of claim 20, further comprising detecting a difference in current flow between a line conductor and a neutral conductor at the outlet to determine whether a ground fault is present.

23. The method of claim 22, further comprising producing said trip signal in response to a determination that a ground fault is present.

24. The method of claim 23, further comprising stopping the current at said outlet in response to said trip signal.

25. The method of claim 19, further comprising additionally processing voltage zero crossing information to determine whether an arcing fault is present.

26. The method of claim 19, further comprising detecting a difference in current flow between a line conductor and a neutral conductor at the outlet to determine whether a ground fault is present.

27. The method of claim 26, further comprising producing a trip signal in response to a determination that a ground fault is present.

28. The method of claim 27, further comprising stopping the current at said outlet in response to said trip signal.

29. The method of claim 19, wherein said sensing, said determining and said processing take place at an outlet receptacle portion of said electrical outlet.

30. The method of claim 19, wherein said sensing, said determining and said processing take place at an outlet box in which an outlet receptacle is installed.

* * * * *